C. E. LOWE.
LUBRICATOR FOR HANDSAWS.
APPLICATION FILED DEC. 21, 1908.

925,437.

Patented June 15, 1909.

Witnesses:
E. B. Yeaton
M. A. Dremus

Charles Edward Lowe  Inventor

By his Attorney
S. Charles Seaton

UNITED STATES PATENT OFFICE.

CHARLES EDWARD LOWE, OF McALESTER, OKLAHOMA, ASSIGNOR OF ONE-HALF TO WALTER CARL ELLIS, OF GUTHRIE, OKLAHOMA.

LUBRICATOR FOR HANDSAWS.

No. 925,437.　　　Specification of Letters Patent.　　　Patented June 15, 1909.

Application filed December 21, 1908. Serial No. 468,463.

*To all whom it may concern:*

Be it known that I, CHARLES EDWARD LOWE, a citizen of the United States, and a resident of McAlester, Pittsburg county, Oklahoma, have invented new and useful Improvements in Lubricators for Handsaws, of which the following is a full, clear, and exact specification.

My invention relates to lubricators for hand saws and is designed to fit any make of saw to be used as an attachment thereto, and may be readily secured to the saw without the necessity of making any alterations to adapt it thereto, and may be as readily removed from the saw and secured to another saw when occasion may require.

Figure 1:
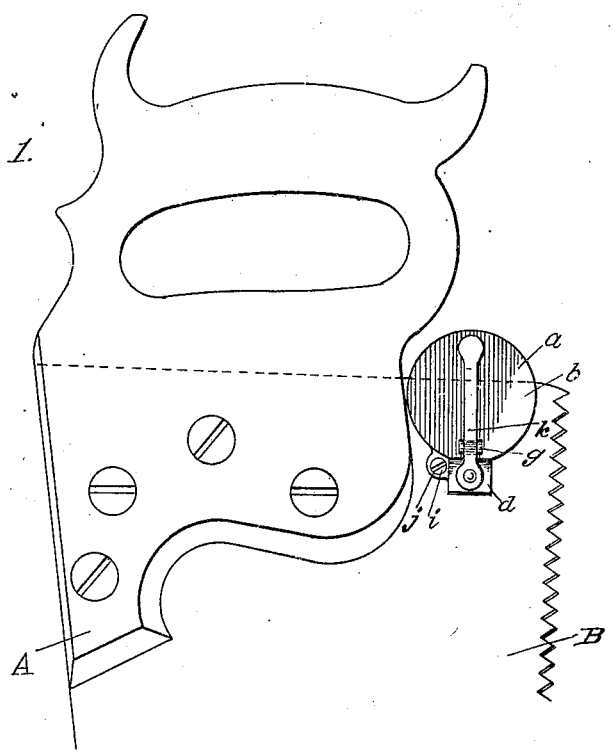
Figure 2:
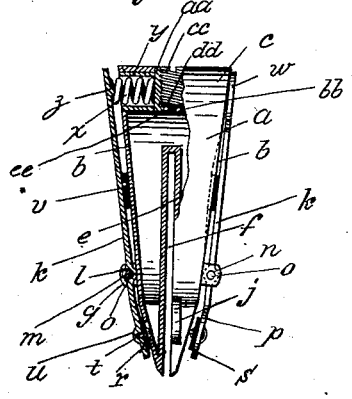
Figure 3:
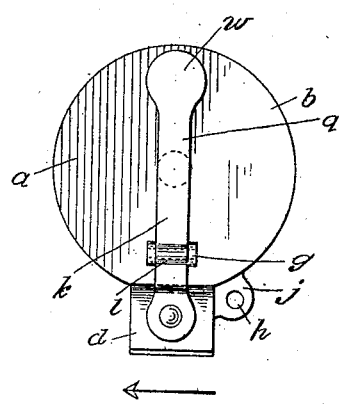

Referring to the drawings forming part of this specification, Figure 1 is the handle end of a saw, with the lubricator secured to the blade ready for use. Fig. 2 is a view of the lubricator detached, looking in the direction of the arrow in Fig. 3. The left half is in section showing the interior of the lubricator with the oil outlet valve closed; the right half is an outside view showing the oil exit valve open. Fig. 3 is a view of the lubricator similar to Fig. 1 but showing the other side thereof.

The reservoir $a$ may be of any convenient shape. I prefer to make it of substantially cylindrical formation and for neatness of appearance it may have a slightly wedge-shaped or tapering formation. The reservoir, therefore, comprises the cylindrical wall $c$ and the two sides $b$ which slightly converge toward the bottom and terminate in a wedge-shaped snout like member $d$, the interior of which, together with the interior of the cylinder, forms the receptacle for the oil. The reservoir is divided through the center by the partition wall $e$, which extends to a suitable distance up the reservoir and divides it into two separate receptacles connected at the top, that is, above the partition. A slot $f$ extends through the partition, of sufficient width to receive any ordinary saw blade. On either side of the slot and preferably in the shoulder formed by the union of the snout and cylinder are the lugs $j$ provided with the screw holes $h$ for receiving the screw $i$. It is necessary that a hole be made in the blade to permit the screw to pass through, and one of the holes $h$ is threaded to receive the threads on the screw.

Fig. 1 shows the lubricator secured upon a saw A. The blade B is passed in the slot $f$ and the screw $i$ inserted in the holes $h$ and the hole in the blade (the three holes being in register) and the screw screwed into the tap in the farther lug. If it is preferred, there may be only one lug. This may be tapped to receive a set screw which may be forced against the saw blade. This will obviate the necessity of providing a hole in the blade, but the first mentioned means of securing the lubricator to the blade has the advantage of more securely fastening the lubricator and at the same time holds the two halves firmly together at their free ends.

Upon the sides $b$ of the cylinder are pairs of lugs $g$ to which are fulcrumed the levers $k$. For neatness of construction, these levers are made of thin metal and sufficiently wide to give the required strength. They have the enlarged parts $l$ between the lugs to provide for the holes $m$. There are holes $n$ in the lugs in alinement with the holes in the levers and pins $o$ are passed through these holes to secure the lever in pivotal connection to the lubricator. The lower arm $p$ of each lever is shorter than the upper arm $q$ and is slightly bent inward and enlarged to adapt it to completely cover an oil outlet orifice $r$ formed in the snout. To insure a tight closing of the orifice, a disk $s$ made of suitably soft material such as rubber or felt is preferably interposed between the lever and the outlet to completely cover the outlet. It is secured to the lever, preferably by screw $t$ passed through the disk and screwed into the lever, which is provided with the enlargement $u$ to receive the screw without permitting it to extend through the lever.

Between the upper arm of each lever and the head of the cylinder adjacent thereto is secured a disk or push button $v$. The disk is preferably made of rubber or some similar substance, or it may be a metal spring. It is placed at the center of the cylinder head and may be screwed to the lever arm. The cylinder heads are made of sheet material, and resemble the bottom of an ordinary oil can, that is, they are made flexible. When the lever is pressed in as shown on the right side in Fig. 2, the disk $v$ forces the head of the cylinder in as shown by the dotted lines and at the same time the lower arm of the lever rises and opens the outlet orifice. The forcing of the side in compresses the oil, or the oil and air in the space above, which pressure forces the oil out of the orifice. The oil moves down to the edge of the snout and upon the saw blade where it can be spread about by the hand if found necessary. As the apparatus is similar on both sides of the blade, a uniform oiling on both sides will be effected. When pushing the lever inward, it will slightly compress the push-button before the side begins to be forced in. This will permit the orifice in the oil chamber to be opened, otherwise were the pressure in the oil produced before the valve opened, the oil would spurt out on opening the valve with considerable force and be ejected away from the blade. Moreover, when the levers are released after the saw has been oiled, the heads of the cylinder come to their normal or neutral positions before the ports close, which permits air to rush in to replace the oil ejected and prevents a partial vacuum.

The resiliency of the push-buttons and the cylinder heads may be relied upon to close the ports when the manual pressure has been released from the levers, but I prefer to provide additional means to insure a positive closing of the port. The upper ends of the levers are enlarged forming the finger pieces $w$ and behind them are inserted springs $x$. The inner ends of the springs seat in depressions or cups $y$ formed in the oil receptacle and their upper ends are retained in place by the parts $z$ formed on the levers. When the springs $x$ are used, there may be a little clearance space between the disks $v$ and the respective cylinder head when the parts are in their normal positions. Another depression or cup $aa$ is provided at any convenient part of the reservoir, preferably at the top, as shown in Fig. 2 and having an orifice $bb$ in its bottom for refilling the lubricator; the depression is screwthreaded and a plug $cc$ is screwed therein. To fill the lubricator, it is only necessary to remove the plug, and pour the oil in the cup from which it will run into the reservoir through the opening at the bottom. To insure an air-tight closing of the reservoir when the plug is screwed in, a pliable disk $dd$, as rubber or felt, may be secured to the bottom of the plugs as by a screw $ee$.

The widest part of my lubricator should preferably be no wider than the width of the handle, which will then shield it from accidental injury. It is preferable where there is sufficient room, to mount it under the handle as shown in Fig. 1, but if necessary, it may be secured to the back of the blade near the handle. It is operated by simply pressing the two levers in which may be done at the same time if desired by applying a thumb on one lever and a first finger on the lever opposite.

Having thus described my invention, I claim—

1. As an attachment for saws, a lubricator adapted to be mounted in exposed position on the blade of the saw and comprising a reservoir for containing the oil, a partition wall dividing the interior of the reservoir and extending from the bottom thereof to a suitable distance from the top, a slot in said wall for receiving the saw blade, means for securing the lubricator to the blade, oil exit orifices in the sides of the lubricator near the bottom, and means external of the reservoir for opening and closing the said orifices.

2. As an attachment for saws, a lubricator adapted to be mounted in exposed position on the blade of the saw and comprising a reservoir for containing the lubricant, a partition wall dividing the interior of the reservoir and extending from the bottom thereof to a suitable distance from the top, a slot in said wall for receiving the saw blade, lugs oppositely disposed extending from the reservoir on either side of the slot, a screw adapted to pass through holes in the lugs and the saw blade, the hole in one lug being tapped to receive the thread of the screw to secure the lubricator in position, oil exit orifices oppositely disposed in the sides of the lubricator near the bottom levers secured on the outside of the lubricator normally closing the orifices and adapted to be manually operated to open the orifices and means for automatically closing the orifices.

3. As an attachment for saws, a lubricator adapted to be mounted in exposed position on the blade of the saw and comprising a reservoir having flexible sides for containing the oil, a partition wall dividing the interior of the reservoir and extending from the bottom thereof to a suitable distance from the top, a slot in said wall for receiving the saw blade, lugs oppositely disposed extending from the reservoir on either side of the slot, a screw adapted to pass through holes formed in the lugs and saw blade, the hole in one of the lugs being tapped to receive the thread of the screw to secure the lubricator in position, oil exit orifices oppositely disposed in the sides of the lubricator near the bottom, pairs of lugs formed on the sides above the orifices, levers fulcrumed to and between the lugs of each pair, suitably soft disks secured to the lower arms of the levers positioned to close the orifices and a push button between each side of the lubricator and the upper arm of the adjacent lever adapted to push the flexible side in when the upper arm is pushed in to open the orifice for the purposes as set forth.

4. As an attachment for saws, a lubricator adapted to be mounted in exposed position on the blade of the saw and comprising a reservoir having flexible sides for containing the oil, a partition wall dividing the interior of the reservoir and extending from the bottom thereof to a suitable distance from the top, a slot in said wall for receiving the saw blade, lugs oppositely disposed extending from the reservoir on either side of the slot, a screw adapted to pass through holes in the lugs and saw blade, the hole in one of the lugs being tapped to receive the thread of the screw to secure the lubricator in position, oil exit orifices oppositely disposed in the sides of the lubricator near the bottom, pairs of lugs formed on the sides above the orifices, levers fulcrumed to and between the lugs of each pair, a suitably soft disk screwed to the lower arm of each lever positioned to close the orifice adjacent thereto, a push button between each side of the lubricator and the upper arm of the lever adjacent thereto adapted to push the flexible side of the reservoir in when the upper arm of the lever is pushed in to raise the lower arm to open the orifice to emit the oil, springs seated in depressions formed in the lubricator behind the upper arms near the ends thereof and pressing against said arms to automatically raise the arms to close the outlets, a screwthreaded depression in the top of the lubricator, a hole in the bottom of the depression, and a screwthreaded plug screwed in the hole to close the orifice.

CHARLES EDWARD LOWE.

Witnesses:
C. J. SAMPLE,
FRANK SMITH.